July 7, 1970  P. BIEBER  3,519,079
HORSESHOE AND METHOD OF MAKING SAME
Filed Nov. 21, 1968  3 Sheets-Sheet 1
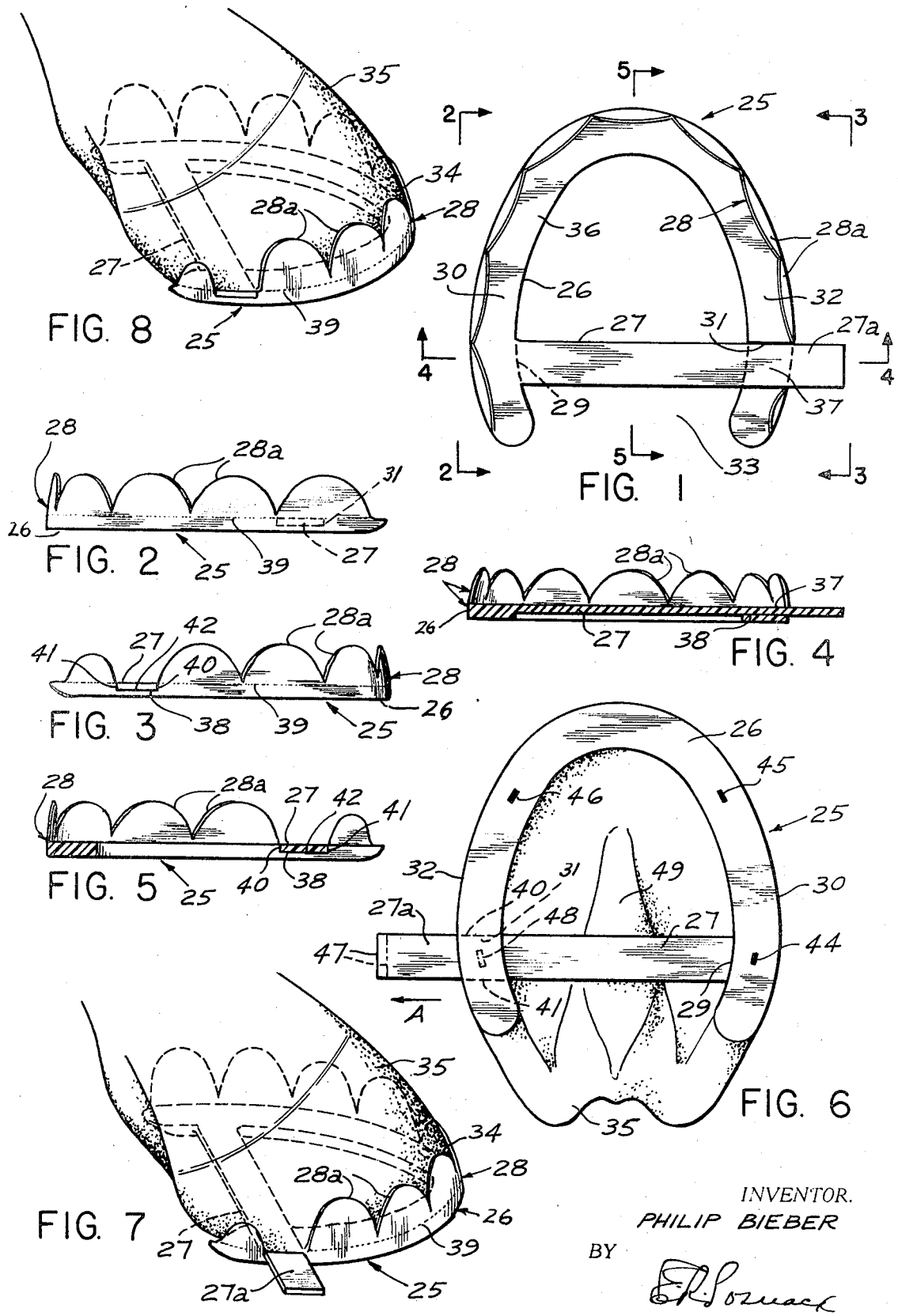
INVENTOR.
PHILIP BIEBER
BY
ATTORNEY July 7, 1970

P. BIEBER 3,519,079

HORSESHOE AND METHOD OF MAKING SAME

Filed Nov. 21, 1968

INVENTOR.
PHILIP BIEBER

BY

[signature]

ATTORNEY

July 7, 1970  P. BIEBER  3,519,079
HORSESHOE AND METHOD OF MAKING SAME
Filed Nov. 21, 1968  3 Sheets-Sheet 3

INVENTOR.
PHILIP BIEBER
BY
ATTORNEY

United States Patent Office 3,519,079
Patented July 7, 1970

3,519,079
HORSESHOE AND METHOD OF MAKING SAME
Philip Bieber, 69—34 180th St.,
Flushing, N.Y. 11365
Filed Nov. 21, 1968, Ser. No. 777,822
Int. Cl. A01l 3/00, 5/00
U.S. Cl. 168—4     19 Claims

ABSTRACT OF THE DISCLOSURE

A horseshoe made of light plastic material, adhesively applied to a hoof, and having a pre-stressed resilient tension bar extending transversely across the shoe and a peripheral retainer wall embracing the hoof. The tension bar, pre-stressed by a step in the method of this invention, yieldably restricts excessive spreading of the hoof upon impact with the ground, but permits a limited amount of spreading upon impact of considerable magnitude. The retainer wall supplements the action of the tension bar in restricting the spreading of the hoof, and also helps to maintain the shoe in place without the use of permanently applied nails.

BACKGROUND OF THE INVENTION

The field of the invention

This invention relates to horseshoes and the method of making same, and is particularly, though not exclusively, directed to shoes for race horses.

The known art

Horseshoes are commonly made of metal, such as steel or aluminum. Since such metals do not have the resilient characteristics of the hoof, the conventional U-shaped configuration with a rear opening is employed to permit a slight spreading action of the hoof with each impact. Any substantial restriction against such spreading not only results in painful strains, but also prevents the natural lowering of the soft frog tissue at the underside of the hoof from serving its shock-absorbing function upon contact with the ground. But where the impact of the hoof is of considerable magnitude, as occurs during horse racing, there is the possibility of excessive spreading of the hoof, with the danger of overstretching of the muscles. A known expedient to prevent excessive spreading of the hoof is the incorporation into the shoe of a transverse bar adjacent the rear opening thereof. This expedient, however, has been found to be unsatisfactory because the bar, made of relatively rigid material, such as metal, restricts the spreading of the hoof with the harmful effects above described, causing pain and nullifying the inbuilt protective shock-absorbing structure of the hoof.

In applying conventional metal horseshoes, it is always necessary to drive nails upwardly into the peripheral portion of the hoof. It is extremely important that this operation be done with great precision, since a wrongly directed nail can do considerable injury to the horse's foot. More specifically, the nails must be driven in a generally outwardly direction, any resulting protruding nail point being clipped off or hammered against the outer surface of the hoof; but if through accident, or through the impact action of the hoofs upon each contact with the ground, the shanks of the nail are deflected inwardly, serious damage can be inflicted upon the relatively sensitive muscles and tissue around the inner periphery of the hoof.

Objectives of this invention

It is an object of this invention to provide a horseshoe having none of the aforesaid shortcomings of conventional shoes, and that is adapted for ready fabrication and application, and for effective use particularly for race horses. Among the more specific objectives are the provision of a horseshoe made of relatively light non-metallic material, one that will be protective of the hoof, that will have a degree of resiliency comparable to that of the hoof, that will permit a spreading of the hoof during impact with the ground a sufficient amount to permit the proper functioning of the natural shock-absorbing properties of the hoof but that will nevertheless yieldably restrict any spreading beyond safe limits, and that can be attached to the hoof without the use of nails or the like.

Other objects, features and advantages will appear from the drawings and the description hereinafter given.

SUMMARY OF THE INVENTION

The preferred embodiment of this invention comprises a horseshoe made of relatively light plastic material of tough and resilient properties, the said plastic material being adapted for adhesive application to the hoof. Adjacent the rear opening of the conventionally U-shaped shoe is a pre-stressed transverse tension bar fixedly secured to the opposite sides of the shoe. This bar, made of resilient material of high tensile strength, yieldably permits a limited outward spreading of the hoof with each impact, and yet resists an overspreading of the hoof, thereby obviating the dangers above referred to.

Cooperating with said tension bar in preventing the overspreading of the hoof is an upwardly extending peripheral retaining wall in fixed embracing engagement with the hoof above the base thereof. Since the region of maximum spread of the hoof is at its base, the said peripheral wall, being embracingly attached to a portion of the hoof which is above the base and hence subject to a lesser degree of spread, will serve as a supplementary deterrent to the spreading of the hoof.

The said peripheral retaining wall extends upwardly from the U-shaped base of the shoe, said retaining wall, as well as said base, being preferably made of plastic material and being adhesively attached to the hoof, thereby eliminating the use of nails as permanent fasteners.

Further details of construction and descriptions of various modifications of this invention are hereinbelow set forth.

DESCRIPTIONS OF THE DRAWINGS

FIG. 1 is a top plan view of a horseshoe constituting one embodiment of my invention.

FIG. 2 is a side view thereof looking in the direction of arrows 2—2.

FIG. 3 is an opposite side view thereof looking in the direction of arrows 3—3.

FIG. 4 is a section of FIG. 1 taken along line 4—4.

FIG. 5 is a section of FIG. 1 taken along line 5—5 thereof.

FIG. 6 is a bottom view of the shoe of FIGS. 1 to 5 shown temporarily nailed to the rim of a horse's hoof with the pre-stressed tension bar extending from one side during an intermediate step in the attachment of the shoe, the arrow indicating the direction of an operative pull for extending the bar from its unstressed position indicated by the dot-dash line to the full-line stressed position.

FIG. 7 is a fragmentary perspective view of the hoof and shoe at the intermediate attaching stage of FIG. 6.

FIG. 8 is a view substantially like FIG. 7 but showing the shoe in its final operative position on the hoof.

DESCRIPTION OF PREFERRED EMBODIMENTS OF THIS INVENTION

Figure 9:
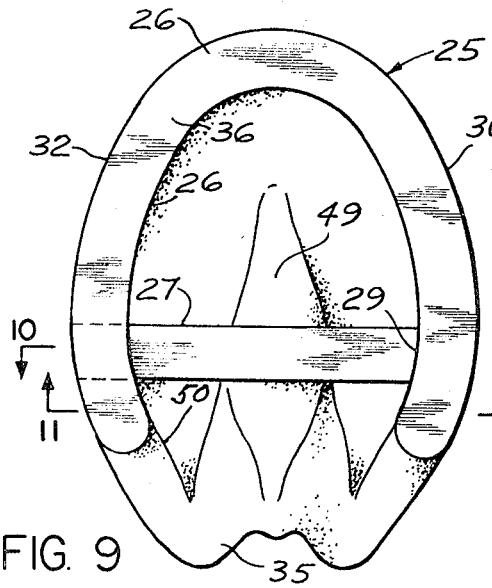
FIG. 9 is a bottom view of FIG. 8.

In the embodiment illustrated in FIGS. 1 to 10, the shoe 27, made of tough and resilient plastic material, comprises the U-shaped base 26, the transverse tension bar 27 and the peripheral retaining wall 28 extending upwardly from said base 26. The said bar 27 is integral with and extends from the juncture 29 of the leg portion or side 30 of said base through the laterally oppositely positioned slot 31 of the leg portion or side 32, the said juncture 29 and slot 31 being adjacent the rear opening 33, as defined by the leg portions, the end portion 27a of said bar 27 extending laterally beyond the slot 31.

Figure 10:
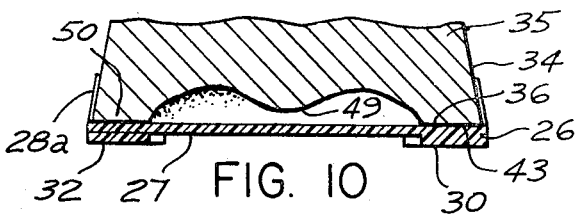
FIG. 10 is a section of FIG. 9 taken along line 10—10.

In the particular embodiment illustrated, the said peripheral retaining wall 28 is integral with the said base 26 and comprises a plurality of thin upwardly extending and inwardly inclined tabs 28a, presenting a scalloped configuration, the said tabs being proportioned and positioned for adjustable positioning about the upwardly and inwardly tapered surface 34 of the hoof 35 (see FIG. 10). A weakened line section 39 separates the retaining wall 28 from the base 26, facilitating the detachment of said base from the hoof when that becomes necessary.

In the preparation and attaching procedure of the shoe of this invention, the hoof 35 is first trimmed, by means known to those skilled in the art, as closely as possible to the size of the base 26 of said shoe 25. Suitable adhesive material is then applied to the upper surface 36 of base 26, the respective upper and lower surfaces 37 and 38 of that portion of the tension bar 27 positioned within the said slot 31, the walls 40, 41 and 42 of the slot 31, and preferably also to the undersurface 43 of the rim of the hoof 35 and the adjacent portion of said outer surface 34. The shoe 25 is then applied to the hoof as shown in FIGS. 6 and 7, and temporarily held in place with a few nails, such as nails 44, 45 and 46 while the adhesive on the contacting surface is setting. A tensioning pull is then immediately applied in the direction of arrow A (FIG. 6), whereby the bar 27 is somewhat elongated to the full line position of the terminal 47 from the unstressed position thereof indicated by dot-dash lines. Then another temporary nail 48 is applied through the bar 27, whereafter the said extending end portion 27a is cut off, the shoe now being in its final form indicated in FIGS. 8 to 11. After the adhesive has set, the temporary nails 44, 45, 46 and 48 are removed, and the shoe is ready for use.

The resilient bar 27, having been pre-stressed in the manner above described, and accordingly being under tension, yieldably holds the base, including said opposite sides 30 and 32 of the shoe, against undue spreading, yet, due to its very resiliency, permits an outward spreading of the hoof when the impact is very great, such as occurs under horse-racing conditions. The lateral displacement of the entire rim 50 of the hoof 35 is additionally restrained by the said retaining wall 28 and its upwardly and inwardly inclined tabs 28a, since said tabs are secured to the correspondingly upwardly and inwardly tapered surface 34 of the hoof. The yieldable inward pull of the tensioned bar 27 is transmitted to the adhesively secured tabs 28a which, forming an acute angle with the base 26 of the shoe, firmly grip the said rim of the hoof, thereby aiding the bar 27 in its operative restraining action. Said peripheral retaining wall 28 thus serves the double purpose of adhesively helping to retain the shoe in place and cooperating with the said tension bar 27 in its spread-restricting function.

Figure 11:
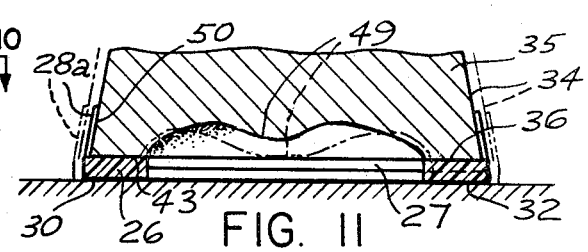
FIG. 11 is a section of FIG. 9 taken along line 11—11, the dot-dash lines showing the position of the hoof rim and frog upon an operative spreading of the hoof resulting from its impact with the ground.

FIG. 11 illustrates by the dot-dash lines the spread positions of the sides 30 and 32 of the shoe, such spreading causing a lowering of the soft frog portion 49 of the hoof in natural manner. When the spread of the hoof is sufficiently great, said frog portion will engage the upper surface of said bar 27 and thus be enabled to perform its natural shock-absorbing function.

Figure 12:
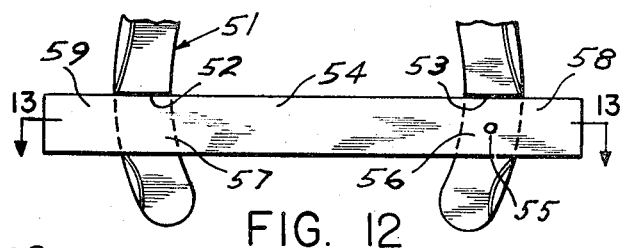
FIG. 12 is a fragmentary top plan view of a modified form of this invention.
Figure 14:
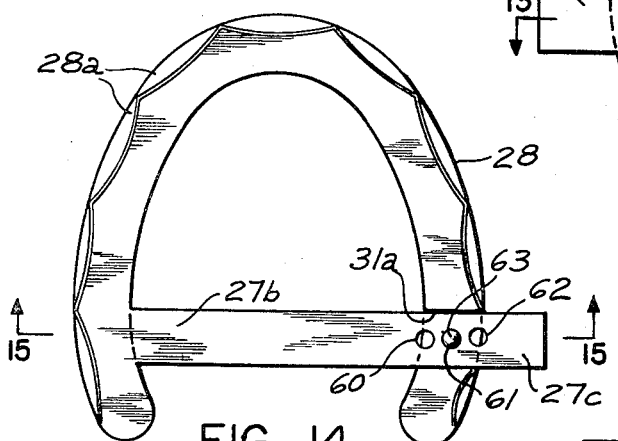
FIG. 14 is a top plan view of another modification of this invention, showing the tension bar extending in unstressed position from the side of the shoe.
Figure 13:
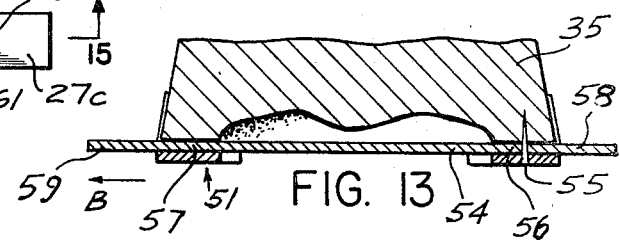
FIG. 13 is a section of the shoe of FIG. 12 taken along line 13—13, the shoe being shown applied to a hoof.
Figure 15:
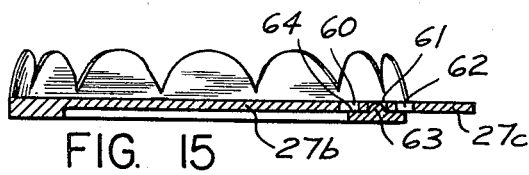
FIG. 15 is a section of FIG. 14 taken along line 15—15.
Figure 17:
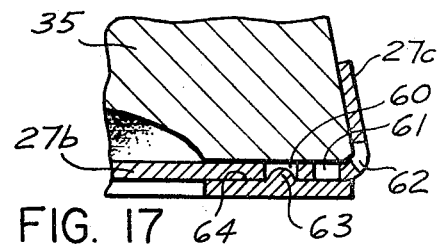
FIG. 17 is an enlarged fragmentary section, taken along line 15—15 of FIG. 14, of the shoe with the stressed bar according to FIG. 16, and with the extending end turned up into adhesive engagement with the side of a hoof to which the shoe is applied.
Figure 16:
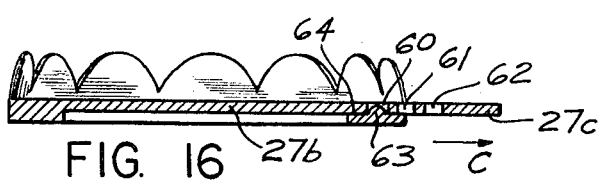
FIG. 16 is a section like FIG. 15, but showing the tension bar in a selected pre-stressed position.

In the embodiment of FIGS. 12 and 13, the shoe 51 has two laterally opposite slots 52 and 53 therein, there being a separate tension bar 54 positioned so as to extend through both of said slots prior to adhesively applying the shoe to the hoof substantially in the manner aforesaid. Nails, like said nails 45 and 46, are applied substantially as shown in FIG. 6, a nail 55 being applied through the portion 56 of the bar positioned in slot 53. Thereafter, a pull is applied in the direction of arrow B to the bar 54, whereafter a nail is applied through the portion 57 of the bar positioned in slot 52. The ends 58 and 59 of the bar are then either cut off or are bent upwardly into adhesive engagement with the side of the hoof in the manner illustrated in FIG. 17 and hereinbelow described. In this form the bar 54 can be made of different material from that of the rest of the shoe 51, so as to meet special requirements of toughness, resiliency etc. that may not be required for the shoe proper.

The embodiment of FIGS. 14 to 17 is substantially like that of FIGS. 1 to 10, except that the tension bar 27b has a series of closely spaced indentures or holes 60, 61 and 62 therein, each adapted to receive therein the detent or protuberance 63 extending upwardly from the bottom wall 64 of the slot 31a. This construction is particularly suitable for use with a hoof that is relatively easy to be fitted. The entire plastic shoe is first placed in warm water, whereby it is temporarily softened and made more malleable. Before any adhesive is applied in the manner above described, the softened shoe is manipulated to make it conform to the operatively trimmed shape of the hoof. Then an outward pull is applied to the bar 27b in the direction of arrow C (FIG. 16) to create tension therein, thereby bringing (in the particular arrangement illustrated) the protuberance 63 into engagement with the hole 60, the interlocking engagement of said protuberance and hole 60 holding the bar in its extended and tensioned condition. All that need be done now is to apply adhesive to the shoe and hoof in the manner aforesaid, and then place the shoe on the hoof. Since the bar 27b is held in prestressed position, no pull is applied to the bar while the shoe is on the hoof, the only additional operation being that of temporarily driving nails in to hold the shoe in place until the adhesive has set, and then bending the end portion 27c upwardly into adhesive engagement with the adjacent outer surface of the hoof 35.

Figure 18:
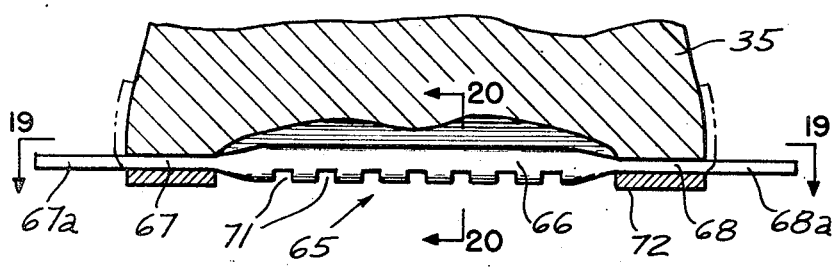
FIG. 18 is a side view of a modified form of tension bar constituting part of another form of this invention shown applied to a hoof, the bar being shown in elevation and the rest of the shoe in section, the dot-dash lines showing the laterally extending flaps operatively in place.
Figure 19:
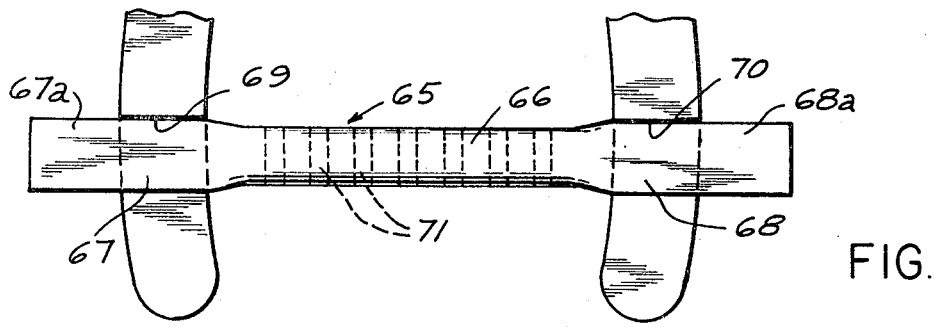
FIG. 19 is a section of FIG. 18 taken along line 19—19.
Figure 20:
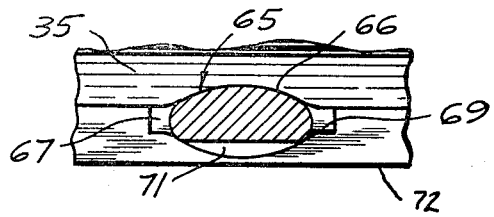
FIG. 20 is a section of FIG. 18 taken along line 20—20.

In the embodiment shown in FIGS. 18 to 20, the tension bar 65 has an elliptical body portion 66 with flattened end portions 67 and 68 extending through the slots 69 and 70, respectively, the outermost portions 67a and 68a being bent upwardly into adhesive engagement with the hoof, in the manner aforesaid. The said elliptical body portion 66 is smooth, the underside having therein the slits 71 extending in the longitudinal direction of the shoe. The said body portion 66 is—as in the other forms of this invention—above the bottom surface 72 of the shoe, so that it is not in contact with the ground. When the horse is in motion, the said slits 71 permit the loose track dirt to flow therethrough as the hoof strikes the ground in forward motion. This arrangement, together with the smooth surface of the bar, reduces to a minimum the frictional effect of the ground material on the transversely positioned bar as it moves forwardly, thereby correspondingly reducing the danger of bending the bar or shearing it at the region of the slots 68 and 69. Moreover, the rounded top of said body portion 66 permits loose dirt particles and mud to slide off the bar, thereby preventing any undesirable foreign ground material from accumulating between the bar and underside of the hoof.

In the above description, the invention has been disclosed merely by way of example and in preferred manner; but obviously many variations and modifications may be made therein. It is to be understood, therefore, that the invention is not limited to any particular form or manner of practicing same.

I claim:

1. A horseshoe having a substantially U-shaped base including a rear opening leg portion and a tension bar attached to and extending transversely across said opening, said bar being of resilient material and constituting a tension means for controlling the adjustment of the leg portions of the base.

2. A horseshoe according to claim 1, said bar being stressed and being connected to oppositely positioned sides of said base.

3. A horseshoe according to claim 2, said tension bar extending transversely across said base and being disposed adjacent the rear portion thereof.

4. A horseshoe according to claim 2, at least one of said sides having a transverse slotted portion therein, one end of said bar being disposed in said slotted portion and being secured thereto.

5. A horseshoe according to claim 2, one end of said bar being unitary with one of said sides, the other side having a slotted portion therein, the other end of said bar being disposed in said slotted portion and secured thereto.

6. A horseshoe according to claim 4, said slotted portion being disposed at the upper portion of said base, said bar being disposed at a level above that of the underside of said base, whereby the bar is at all times maintained out of contact with the ground.

7. A horseshoe according to claim 2, both of the sides of said base having laterally opposite slotted portions, said tension bar comprising a separate member with laterally opposite portions disposed within and secured to said respective slotted portions.

8. A horseshoe according to claim 5, said slotted portion extending downwardly from the upper surface of said base and being defined by a bottom wall and two lateral walls, said bar being adjustably interlockable with said bottom wall at predetermined relative positions, said bar being under tension when so positioned.

9. A horseshoe according to claim 8, said bottom wall having an upwardly extending protuberance, said bar having a plurality of spaced recessed portions, said protuberance being in interlocking engagement with a selected one of said recessed portions.

10. A horseshoe according to claim 2, said bar having a body portion with a concavely rounded upper surface, the bottom portion having a plurality of slits extending in the general longitudinal direction of said horseshoe, the surface of said body portion being smooth.

11. A horseshoe according to claim 4, an end portion of said bar which is disposed in a coacting slotted portion extending therebeyond and being bent upwardly and positioned for operative securement to a selected hoof.

12. A horseshoe according to claim 2, said base and bar being made of relatively light, tough and resilient plastic material.

13. A horseshoe having a substantially U-shaped base and a peripheral retaining wall extending upwardly therefrom and proportioned for embracing engagement with the outer surface of a selected hoof.

14. A horseshoe according to claim 13, said retaining wall being integral with said base and comprising a plurality of upwardly and inwardly extending tabs.

15. A horseshoe according to claim 14, said retaining wall having a peripheral weakened portion adjacent said base.

16. A horseshoe according to claim 13, and a transverse resilient tension bar attached to said base and positioned below the level of said retaining wall.

17. A method of shaping a horseshoe having a U-shaped base including leg portions, the steps of providing a tension bar of resilient properties, shaping the shoe to the conformity of the hoof, and stressing said bar by extending it in the direction of its length and securing said stressed bar to said leg portions.

18. A method of shaping a horseshoe having a U-shaped base and a resilient transverse bar connected to one of the sides of said base, the steps of bending the shoe to the conformity of the hoof, stressing said bar by applying a pull thereto in a direction away from the connection of said bar and said side, and securing said stressed bar to the other side of the base.

19. A method of shaping a horseshoe having a U-shaped base, an upwardly extending peripheral retaining wall and a transverse resilient tension bar of a length greater than the width of said base and with an end portion extending laterally beyond said base, comprising the steps of shaping the shoe to the conformity of a selected hoof, stressing said bar by extending it and securing said stressed bar while in said extended condition to said base, adhesively applying said base and retaining wall to the hoof, and bending said laterally extending portion of said bar upwardly for securement to the adjacent portion of said hoof.

References Cited

UNITED STATES PATENTS

| 1,116,326 | 11/1914 | Powlowski et al. | 168—20 |
| 1,861,695 | 6/1932 | Harsey | 168—4 |
| 1,946,636 | 2/1934 | Nygaard | 168—4 |
| 3,050,133 | 8/1962 | Ketner et al. | 168—4 |

FOREIGN PATENTS

| 21,171 | 1929 | Australia. |
| 358,446 | 1931 | Great Britain. |

OTHER REFERENCES

Natural Hoof Horseshoe, Frank Clark, 1967, copy in group 331, class 168 "Plastic Horseshoe Digest."

ALDRICH F. MEDBERY, Primary Examiner

U.S. Cl. X.R.

168—12, 20